Sept. 6, 1932.     T. C. PEW     1,876,315
MACHINE FOR FEEDING TAPERED ROLLERS
Filed Feb. 2, 1931     2 Sheets-Sheet 2
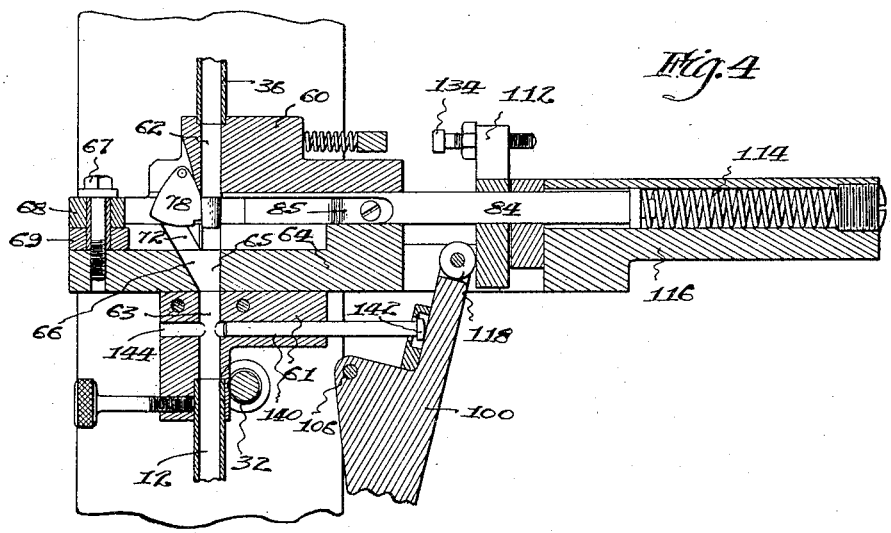
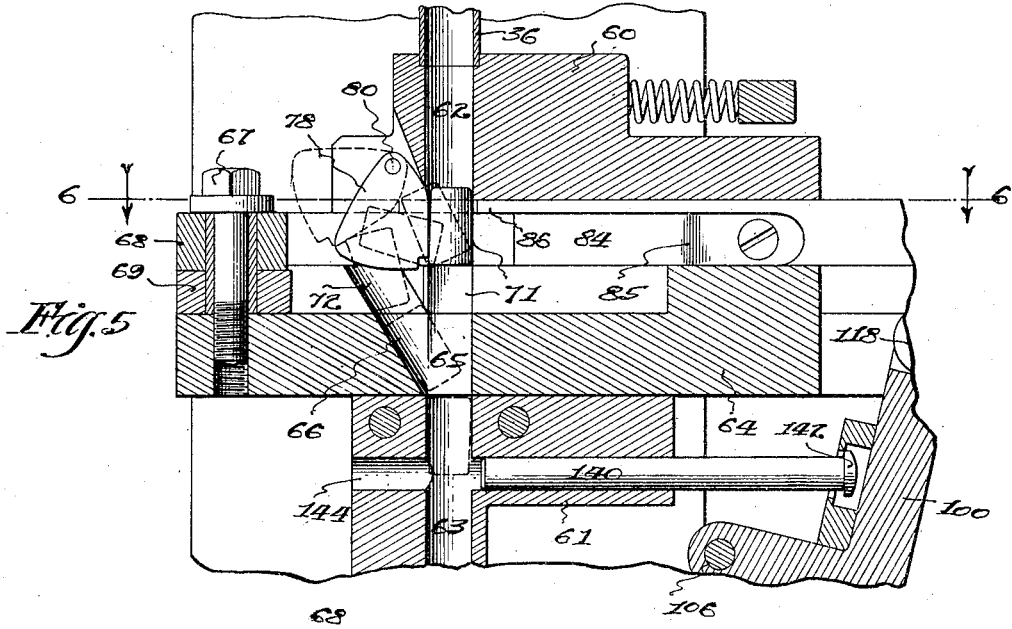
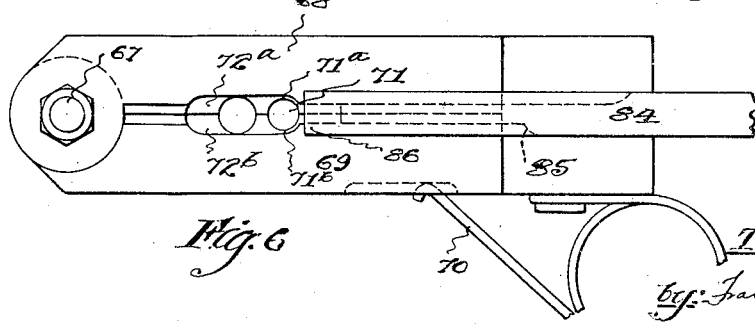

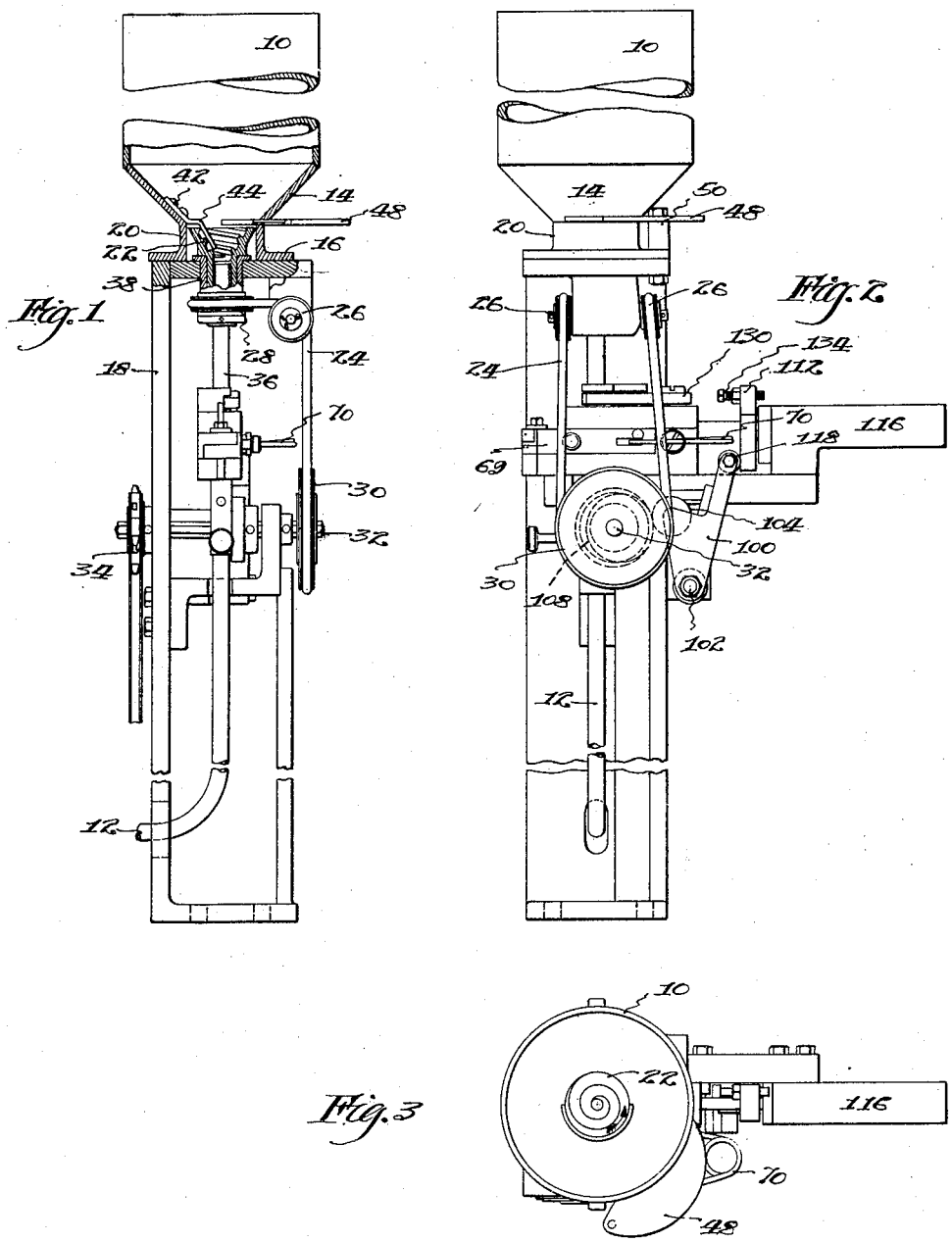

Patented Sept. 6, 1932

1,876,315

UNITED STATES PATENT OFFICE

THOMAS C. PEW, OF ANN ARBOR, MICHIGAN, ASSIGNOR TO HOOVER STEEL BALL COMPANY, OF ANN ARBOR, MICHIGAN, A CORPORATION OF MICHIGAN

MACHINE FOR FEEDING TAPERED ROLLERS

Application filed February 2, 1931. Serial No. 512,796.

This invention relates to machines for feeding rollers into grinding machines for the same, the rollers being of the tapered type, such as are commonly used in tapered roller bearings.

In the application of Thomas C. Pew, Serial No. 474,752, filed August 12, 1930, there is disclosed a grinding machine for tapered rollers into which the rollers are fed with their smaller ends foremost. The machine disclosed in that application is so constructed as to receive rollers having their smaller ends foremost, and accordingly, some means must be provided to insure the feeding of rollers, so positioned, to the grinding machine.

An object of this invention, therefore, is a roller feeding machine adapted for use with the machine disclosed in the above mentioned application and so constructed as to feed rollers with their smaller ends foremost, the feeding machine being provided with means to prevent exodus therefrom of rollers having their larger ends foremost.

A further object is a machine which will feed rollers of the class described into a discharge tube, at regular intervals.

A further object is a novel means for feeding rollers with their smaller ends foremost, the means being so constructed that injury to the rollers as they pass through the feeding machine will be eliminated.

A further object is a machine which is so constructed that rollers coming therethrough with their small ends foremost will pass therethrough without manipulation, whereas, rollers which are presented with their larger ends foremost, are turned over 180 degrees, so that their smaller ends will become foremost, the turning-over process being such that injury to the rollers as they are turned over is largely eliminated.

Still other objects are novel parts of roller feeding machines.

Other objects will readily occur to those skilled in the art upon reference to the following description and the accompanying drawings, in which:

Figure 1 shows in front elevation and partly in section, a roller feeding machine embodying the inventions.

Figure 2 is a side view thereof.

Figure 3 is a top plan view.

Figure 4 is an enlarged sectional view of the roller turning over mechanism.

Figure 5 is a still more enlarged sectional view of the same, dotted lines indicating the position of the parts when a roller is being turned over.

Figure 6 is a view of parts of roller turning over mechanism, as if looking downwardly into the plane 6—6 of Figure 5.

As indicated on the drawings, the roller feeding machine includes a hopper 10 containing a source of rollers which are to be ground, the discharge from the feeding machine and into the grinding machine being through the discharge pipe or tube 12, the flow of rollers from the hopper 10 to the mouth of the discharge pipe 12 being accomplished by gravity. The hopper 10 is provided with a conical lower portion 14 having an annular horizontal flange 16 by means of which the hopper may be bolted upon the base or frame 18 of the feeding machine proper.

In the lower or cylindrical end 20 of the cone 14 there is disposed a conical feeding shell 22 adapted to be rotated at constant speed by the belt 24 which passes over pulleys 26 and 28 and which is driven by the drive pulley 30 mounted upon the horizontal shaft 32, constantly rotated as the machine is being used by the sprocket wheel and chain device indicated at 34, the pulley 28 being mounted upon a stationary hollow vertical shaft or tube 36 around which is disposed the cylindrical shell 38 which is secured to the pulley 28 and to which is secured the feeding cone or shell 22; parts 22, 28 and 38 rotating as a unit.

The interior of the shell 22 is provided with a coarse thread, of large pitch, and the rollers, as they come from the conical bottom 14, drop into the threads of the feeding shell 22. Projecting into the shell 22 and secured to the conical bottom 14 by means of rivets or bolts 42, is an element 44 which overlies the thread of the shell 22 and provides a space between it and the shell under which a roller may be carried by the rotating shell 22.

It will be seen that when rollers are received in the shell 22, they will be carried thereby, one by one, under the element 44 whereupon the latter will hold the rollers non-rotatable while the shell 22 is rotating. Thus, the descent of rollers, one by one, into the hollow shaft 36 from where it passes to the roller turning over part of the feeding machine is effected.

When cessation of the flow of rollers from the hopper 10 is desired, a gate 48, mounted on a vertical pivotal axis 50, may be rotated in a horizontal plane by any suitable means or manually, into a position above the conical shell 22, so as to prevent rollers passing from the cone 14 into the machine proper. During the operation of the machine, the gate is swung into its inoperative position, as will be understood.

At the lower end of the hollow shaft 36 and connecting the latter with the upper end of the discharge tube 12 are disposed roller guides 60 and 61, they having alined vertical bores 62 and 63 through which rollers descending from the tube 36 may pass. Disposed beneath the guide 60 is a part 64 forming a base for the turning over mechanism about to be described, the base 64 having a vertical bore 65 and an angularly disposed bore 66. Pivotally mounted on the base 64 by means of the vertically disposed, pivot-forming bolt 67 are jaws 68 and 69, shown in detail in Figure 6. Jaw 68 is stationary and jaw 69 is movable by means to be described, against the influence of spring 70 which is held on a stationary part of the machine by a screw.

The jaws are formed with complementary semicylindrical slots 71a, 71b and 72a and 72b, which cooperate when the jaws are closed, to form bores 71 and 72. Bore 71 is vertical and is in alignment with bores 62, 63 and 65. Its diameter is uniform and is a trifle smaller than the largest diameter of a roller, and a trifle larger than the smallest diameter of the roller. Bore 72 is disposed at an angle with respect to bore 71, its lower end meeting the upper end of bore 66. The axes of bores 71 and 72 are, however, in alignment with the axis of pivotal movement of the jaws 66 and 67, and with the plane of separation of the jaws. The bores 62, 71, 65 and 63 form a vertical continuous path, while a second and discontinuous path is formed by bore 62, 72, 66 and 63.

Disposed within the roller guide 60 is a weighted element or trip 78, the latter being pivotally mounted in the guide 60 by means of the horizontally disposed pivot pin 80, the normal or gravitational position of the trip 78 is such that its right hand edge surface which is planar, is alined with the left hand surface of the bore 71 in the jaw 68. It may be moved, however, as indicated in Fig. 5 out of such position. Disposed within a stationary part of the machine, in a position to move horizontally across and under the bore 62, is a plunger element 84, which moves into the bore 71, reciprocable by mechanism which will be described.

When a roller comes down from bore 62 with its smaller end foremost, it slides into bore 71 for a slight distance. Plunger 84 then advances, and a cam 85 carried thereby engages movable jaw 69, opening it, and permitting the roller to drop into bore 65, from whence it passes through bore 63 and discharge tube 12. When a roller comes down with its larger end foremost, however, its end will come to rest upon the upper edge of the bore 71 in the jaws 68 and 69; plunger 84 which is constantly reciprocating, comes across bore 70 in jaw 66 and its upper edge, which is extended as at 86, strikes the upper end of the roller on its right hand surface, causing it to turn over 180 degrees against the influence of the trip 78, until the roller's lower end is above the upper end of the bore 72. Further advance of the plunger opens jaw 69, permitting the rolls to drop into bore 72, large end foremost, from whence it drops through bores 66 and 63 and the discharge tube 12.

The parts are so dimensioned that when a roller, with its smaller end foremost, comes to rest in bore 71, its upper edge will be below extension 86 of plunger 84, the latter thus clearing the roller and permitting it to drop into the discharge tube without manipulation. Further, weighted trip 78 is so positioned that it will be impossible for a descending roller, small end foremost, to travel down bore 62 at such an angle that its edge will rest on the edge of bore 71. Accordingly, turning over of properly positioned rollers is prevented. Further, a roller, large end foremost, and partially turned over, cannot topple backwards into bore 71, the latter being closed by plunger 84 at this time. Further trip 78, resting on the end of a partially turned over roller (Fig. 5) causes the end to go into bore 72, as will be observed.

The mechanism for causing reciprocation of the plunger 84 includes an arm 100 pivotally mounted on the machine base or standard 18 by means of the horizontal pivot 102. The arm bears on its left hand surface a roll 104 mounted on an axle forming pin 106. A cam 108 is secured to the shaft 32, constantly rotating with it, and when the radially outwardmost portion of the cam 108 engages the roll 104, arm 100 will be moved to the right, whereupon it will cause collar 112 secured to plunger 84 in any suitable fashion, to move to the right retracting the plunger from its bore closing position.

When arm 100 is free of the influence of the cam, the coiled, constantly expanding spring 114 secured in the casing 116 tends to move plunger 84 to the left, as permitted by the upper end 118 of arm 100, whereupon plunger 84 will close the bore 71 in jaw 68 and strike a roller which may happen to be there, turning the latter over as previously described, and open the jaw 69 against spring 70.

In order to prevent the passage into the bore 62 of more than one roller at a time, and in order to prevent rollers passing through the machine when the turing over mechanism is not operating, there is provided a horizontally disposed gate 130 mounted upon a vertical pivot and adapted to be opened by the stop-forming bolt 134, threaded into the collar 112 of the plunger 84. It will be seen that when plunger 84 is advanced, stop 134 will engage the crank arm, not shown, of the gate 130, opening the latter and permitting a roller to descend into the bore 71. Accordingly, when plunger 84 is not being moved or is out of its bore closing position, the gate will be maintained in its closed position and the passage of rollers from the tube 36 is prevented.

Additional means, such as a transversely reciprocating pin 140, connected to the arm 100 at bolt head 142 and movable in transverse bore 144 of the lower roller guide 61, may be provided to prevent the discharge of rollers from the bore 63 into the discharge tube 12, such means further insuring the feeding of rollers to the grinding machine only when desired.

It will be seen, therefore, that there has been provided a feeding machine of the character specified which permits the flow of rollers from the hopper to the grinding machine, by gravity; automatically insures the rollers descending small end foremost; prevents the flow of rollers when the turning over mechanism is not operating; requires no attendance for its operation, and is as simple of construction as it is efficient in the accomplishment of its purpose.

Now, having described the invention and the preferred forms of embodiment thereof, it is to be understood that the said invention is to be limited not to the specific details herein described and illustrated, but only by the scope of the claims which follow.

What I claim is:

1. In a machine for feeding rollers or the like, feeding means including a rotating conical shell having an internal thread and having an opening at its apex the axis of the shell being substantially vertical, the latter being at the bottom of the cone, and a stationary element in said shell overlying the thread and disposed in parallel relation to the adjacent element of revolution of the cone.

2. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost, and including a portion having a bore through which properly positioned rollers may pass without manipulation, said bore being of a diameter less than the largest diameter of the roller and greater than that of the smallest diameter of the roller, there being intermittently operating means to increase the diameter of the bore to permit rollers to pass therethrough intermittently.

3. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost and including a portion having a bore through which properly positioned rollers may pass without manipulation, said bore being of a diameter less than the largest diameter of the roller and greater than that of the smallest diameter of the roller, there being means operating intermittently to increase the diameter of the bore to permit rollers to pass therethrough intermittently, there being a second and larger bore into which are thrust improperly positioned rollers which cannot pass through the first bore.

4. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost and including a portion having a bore through which properly positioned rollers may pass without manipulation, said portion including a pair of relatively movable jaws having complementary slots which cooperate to form the bore.

5. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost, and including a portion having a bore through which properly positioned rollers may pass without manipulation, said bore being of a diameter less than the largest diameter of the roller and greater than that of the smallest diameter of the roller, there being means operating intermittently to increase the diameter of the bore to permit a roller to pass therethrough, there being a second and larger bore into which are thrust improperly positioned rollers which cannot pass through the first bore, and means by which rollers are turned over and thrust into said second bore with their small ends foremost, said turning over means including a reciprocating plunger having a portion which increases the diameter of the small bore and a portion which engages a roller to turn it over.

6. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost, and including a portion having a bore thru which properly positioned rollers may pass without manipulation, said bore being of a diameter less than the largest diameter of the roller and greater than that of the smallest diameter of the roller, there being means operating intermittently to increase the diameter of the bore to permit rollers to pass therethru, intermittently, there being a second and larger bore into which are thrust improperly positioned rollers which cannot pass thru the first bore, the rollers being turned over by turning over mechanism and thrust into said second bore with their small ends foremost, said turning over mechanism including a reciprocating plunger having a portion which increases the diameter of the small bore and a portion which engages a roller to turn it over, the roller engaging portion being in advance and above the jaw opening portion.

7. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost and including a portion having a bore thru which properly positioned rollers may pass without manipulation, said bore being of a diameter less than the largest diameter of the roller and greater than that of the smallest diameter of the roller, and a trip for preventing improper passage of rollers as they enter the small bore.

8. In a machine for feeding tapered rollers, a feeding tube, a discharge tube, and means insuring the flow of rollers from said feeding tube to said discharge tube with their smaller ends foremost, said means being so constructed as to prevent the flow of rollers having their largest ends foremost and including a portion having a bore thru which properly positioned rollers may pass without manipulation, said bore being of a diameter less than the largest diameter of the roller, there being means operating intermittently to increase the diameter of the bore to permit a roller to pass therethru, means to turn over improperly positioned rollers, and a gate above said bore and operatively connected to said turning over means so as to be closed at all times except when said turning over means is in position to turn over improperly positioned rollers.

9. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost and including a portion having a bore thru which properly positioned rollers may pass without manipulation, said bore being of a diameter less than the largest diameter of the roller and greater than that of the smallest diameter of the roller, means to turn over improperly positioned rollers, means to increase the diameter of the bore to permit a roller to pass therethru, and a gate below said bore and operatively connected to said turning over mechanism so as to open only after each turning over movement thereof.

10. In a machine for feeding tapered rollers, a feeding tube, a discharge tube, and means insuring the flow of rollers from said feeding tube to said discharge tube with their smaller ends foremost, said means being so constructed as to prevent the flow of rollers having their largest ends foremost and including a portion having a bore thru which properly positioned rollers may pass without manipulation, said bore being of a diameter less than the largest diameter of the roller and greater than that of the smallest diameter of the roller, means to turn over improperly positioned rollers, means to increase the diameter of the bore to permit a roller to pass therethru, a gate above said bore and operatively connected to said turning over mechanism so as to be closed at all times except when said mechanism is in position to turn over improperly positioned rollers, and a gate below said bore and operatively connected to said turning over mechanism so as to open only after each turning over movement thereof.

11. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost and including a portion having a bore thru which properly positioned rollers may pass without manipulation, said portion including a pair of relatively movable jaws having complementary slots which cooperate to form the bore, means to turn over improperly positioned rollers, means to open the jaws and thereby to increase the diameter of the bore to permit a roller to pass therethru, a gate above said bore and operatively connected to said turning over mechanism so as to be closed at all times except when said mechanism is in position to turn over improperly positioned rollers, and a gate below said bore and operatively connected to said turning over mechanism so as to open only after each turning over movement thereof.

12. Turning over mechanism for feeding machines for tapered rollers, comprising a pair of relatively separable jaws having complementary pairs of slots forming bores, one of which is smaller than the other, a reciprocating plunger adapted to be advanced to open said jaws, means for advancing said plunger, automatically and intermittently operating means to retract said plunger, and an extended portion carried by said plunger and adapted to cover the smaller of the bores and to engage a roller to turn it over and to cause it to enter the larger bore.

13. Turning over mechanism for feeding machines for tapered rollers, comprising a pair of relatively separable jaws having complementary pairs of slots forming bores, one of which is smaller than the other, a reciprocating plunger adapted to be advanced to open said jaws, means for advancing said plunger, automatically and intermittently operating means to retract said plunger, and an extended portion carried by said plunger and adapted to cover the smaller of the bores and to engage a roller to turn it over and to cause it to enter the larger bore, said portion being so disposed as not to engage a roller partially disposed in the smaller bore but to engage only those rollers resting on the jaws over the smaller bore.

14. Turning over mechanism for feeding machines for tapered rollers, comprising a pair of relatively separable jaws having complementary pairs of slots forming bores, one of which is smaller than the other, a reciprocating plunger adapted to be advanced to open said jaws, means for advancing said plunger, automatically and intermittently operating means to retract said plunger, an extended portion carried by said plunger and adapted to cover the smaller of the bores and to engage a roller to turn it over and to cause it to enter the larger bore, said portion being so disposed as not to engage a roller partially disposed in the smaller bore but to engage only those rollers resting on the jaws over the smaller bore, and a trip movable by and upon movement of said plunger from a portion wherein it conceals the larger bore to one wherein it exposes the larger bore.

15. Turning over mechanism for feeding machines for tapered rollers, comprising a pair of relatively separable jaws having complementary pairs of slots forming bores, one of which is smaller than the other, a reciprocating plunger adapted to be advanced to open said jaws, means for advancing said plunger, automatically and intermittently operating means to retract said plunger, an extended portion carried by said plunger and adapted to cover the smaller of the bores and to engage a roller to turn it over and to cause it to enter the larger bore, said portion being so disposed as not to engage a roller partially disposed in the smaller bore but to engage only those rollers resting on the jaws over the smaller bore, and a trip movable by and upon movement of said plunger from a portion wherein it conceals the larger bore to one wherein it exposes the larger bore, a gate disposed over said bore and so mounted as to be opened by the plunger, as it advances, being closed at all other times, and a gate under said bore and carried by said plunger and so mounted as to permit discharge from said bore only as said plunger retracts.

16. In a machine for feeding tapered rollers, a feed container, a discharge tube, and means insuring the flow of rollers from said feed container to said discharge tube with their smaller ends foremost, said means being so constructed as not only to prevent the flow of rollers having their larger ends foremost but to eject from the path of flow rollers having their larger ends foremost.

17. In a machine for feeding tapered rollers, a feed container, a discharge tube, and means insuring the flow of rollers from said feed container to said discharge tube with their smaller ends foremost, said means being so constructed as not only to prevent the flow of rollers having their larger ends foremost but to eject from the path of flow rollers having their larger ends foremost, and including a portion having a bore through which properly positioned rollers may pass without manipulation, said bore being of a diameter less than the largest diameter of the roller and greater than that of the smallest diameter of the roller.

18. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost, and including a portion having a bore through which properly positioned rollers may pass without manipulation, said bore being of a diameter less than the largest diameter of the roller and greater than that of the smallest diameter of the roller, there being means operating intermittently to increase the diameter of the bore to permit rollers to pass therethrough intermittently, there being a second and larger bore into which are thrust improperly positioned rollers which cannot pass through the first bore, the last mentioned means operating to turn over the rollers and thrust them into said second bore with their small ends foremost.

19. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost, and including a portion having a bore through which properly positioned rollers may pass without manipulation, said portion including a pair of relatively movable jaws having complementary slots which cooperate to form the bore, and mechanism for turning over improperly positioned rollers.

20. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost, and including a portion having a bore through which properly positioned rollers may pass without manipulation, said portion including a pair of relatively movable jaws having complementary slots which cooperate to form the bore, said bore being of a diameter less than the largest diameter of the roller and greater than that of the smallest diameter of the roller.

21. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost, and including a portion having a bore through which properly positioned rollers may pass without manipulation, but through which improperly positioned rollers can not pass, said portion including a pair of relatively movable jaws having complementary slots which cooperate to form the bore, there being means operating intermittently to open the jaws and thereby to increase the diameter of the bore so as to permit rollers to pass therethrough intermittently.

22. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost, and including a portion having a bore through which properly positioned rollers may pass without manipulation, said portion including a pair of relatively movable jaws having complementary slots which cooperate to form the bore, there being a second and larger bore formed by complementary slots in said jaws, and into which are thrust improperly positioned rollers which cannot pass through the first bore.

23. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost, and including a portion having a bore through which properly positioned rollers may pass without manipulation, said portion including a pair of relatively movable jaws having complementary slots which cooperate to form the bore, there being a second and larger bore formed by complementary slots in said jaws, and into which are thrust improperly positioned rollers which cannot pass through the first bore, and means by which the rollers are turned over and thrust into said second bore with their small ends foremost.

24. In a machine for feeding tapered rollers, a feeding tube, a discharge tube, and means insuring the flow of rollers from said feeding tube to said discharge tube with their smaller ends foremost, and means being so constructed as to prevent the flow of rollers having their larger ends foremost, and including a portion having a bore through which properly positioned rollers may pass without manipulation, said portion including a pair of relatively movable jaws having complementary slots which cooperate to form the bore, there being a second and larger bore formed by other complementary slots in said jaws, and into which are thrust improperly positioned rollers which cannot pass through the first bore, said bores discharging into the discharge tube, the rollers being turned over by turning over mechanism and thrust into said second bore with their small ends foremost, said turning over mechanism including a reciprocating plunger having a portion which increases the diameter of the small bore and a portion which engages a roller to turn it over.

25. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost, and including a portion having a bore through which properly positioned rollers may pass without manipulation, said bore being of a diameter less than the largest diameter of the roller and greater than that of the smallest diameter of the roller, means to turn over improperly positioned rollers, and a trip for preventing improper passage of rollers as they enter the small bore, and for cooperating with a reciprocating part of the roller turning over mechanism to insure proper action of the latter.

26. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost, and including a portion having a bore through which properly positioned rollers may pass without manipulation, said bore being of a diameter less than the largest diameter of the roller and greater than that of the smallest diameter of the roller, means to turn over improperly positioned rollers, and a trip for preventing improper passage of rollers as they enter the small bore, and for cooperating with a reciprocating part of the roller turning over mechanism to insure proper action of the latter, the trip comprising a weighted element mounted on a horizontal pivot.

27. In a machine for feeding tapered rollers, a feeding tube, a discharge tube, and means insuring the flow of rollers from said feeding tube to said discharge tube with their smaller ends foremost, said means being so constructed as to prevent the flow of rollers having their larger ends foremost, and including a portion having a bore through which properly positioned rollers may pass without manipulation, said portion including a pair of relatively movable jaws having complementary slots which cooperate to form the bore, there being means operating intermittently to open the jaws and thereby to increase the diameter of the bore to permit a roller to pass therethrough, means to turn over improperly positioned rollers, and a gate above said bore and operatively connected to said turning over means so as to be closed at all times except when said turning over means is in position to turn over improperly positioned rollers.

28. Turning over mechanism for feeding machines for tapered rollers, comprising a pair of relatively separable jaws having complementary pairs of slots forming bores, one of which is smaller than the other, a reciprocating plunger adapted to be advanced to open said jaws, means for advancing said plunger, automatically and intermittently operating means to retract said plunger, an extended portion carried by said plunger and adapted to cover the smaller of the bores and to engage a roller to turn it over and to cause it to enter the larger bore, and a gate disposed over said bore and so mounted as to be opened by the plunger, as it advances, being closed at all other times.

29. Turning over mechanism for feeding machines for tapered rollers, comprising a pair of relatively separable jaws having complementary pairs of slots forming bores, one of which is smaller than the other, a reciprocating plunger adapted to be advanced to open said jaws, means for advancing said plunger, automatically and intermittently operating means to retract said plunger, an extended portion carried by said plunger and adapted to cover the smaller of the bores and to engage a roller to turn it over, and to cause it to enter the larger bore, and a gate under said bore and carried by said plunger and so mounted as to permit discharge from said bore only as said plunger retracts.

30. Turning over mechanism for feeding machines for tapered rollers, comprising a pair of relatively separable jaws having complementary pairs of slots forming bores, one of which is smaller than the other, a reciprocating plunger adapted to be advanced to open said jaws, means for advancing said plunger, automatically and intermittently operating means to retract said plunger, an extended portion carried by said plunger and adapted to cover the smaller of the bores and to engage a roller to turn it over and to cause it to enter the larger bore, said portion being so disposed as not to engage a roller partially disposed in the smaller bore but to engage only those rollers resting on the jaws over the smaller bore, and a trip movable by and upon movement of said plunger from a portion wherein it conceals the larger bore to one wherein it exposes the larger bore, a gate disposed over said bore and so mounted as to be opened by the plunger, as it advances, being closed at all other times.

31. Turning over mechanism for feeding machines for tapered rollers, comprising a pair of relatively separable jaws having complementary pairs of slots forming bores, one of which is smaller than the other, a reciprocating plunger adapted to be advanced to open said jaws, means for advancing said plunger, automatically and intermittently operating means to retract said plunger, an extended portion carried by said plunger and adapted to cover the smaller of the bores and to engage a roller to turn it over and to cause it to enter the larger bore, said portion being so disposed as not to engage a roller partially disposed in the smaller bore but to engage only those rollers resting on the jaws over the smaller bore, and a trip movable by and upon movement of said plunger from a portion wherein it conceals the larger bore to one wherein it exposes the larger bore, a gate under said bore and carried by said plunger and so mounted as to permit discharge from said bore only as said plunger retracts.

In testimony whereof, I sign this specification.

THOMAS C. PEW.